United States Patent
Hofmann et al.

[11] Patent Number: 5,544,962
[45] Date of Patent: Aug. 13, 1996

[54] WHEEL BEARING UNIT WITH SPEED OF ROTATION SENSOR

[75] Inventors: Heinrich Hofmann, Schweinfurt; Johannes Schottdorf, Hammelburg, both of Germany; Andre F. L. Goosens, Rumst, Belgium

[73] Assignee: FAG Kugelfischer Georg Schafer AG, Germany

[21] Appl. No.: 372,283

[22] Filed: Jan. 13, 1995

[30] Foreign Application Priority Data

Jan. 13, 1994 [DE] Germany ............... 44 00 773.6

[51] Int. Cl.$^6$ ................................... F16C 19/28
[52] U.S. Cl. ............................................. 384/448
[58] Field of Search ........................ 384/448, 446, 384/554, 589; 324/174

[56] References Cited

U.S. PATENT DOCUMENTS

| | | | |
|---|---|---|---|
| 5,125,845 | 6/1992 | Benktander et al. | 384/448 |
| 5,308,171 | 5/1994 | Sakamoto | 384/448 |
| 5,428,289 | 6/1995 | Sahashi et al. | 384/448 |

*Primary Examiner*—Lenard A. Footland
*Attorney, Agent, or Firm*—Ostrolenk, Faber, Gerb & Soffen, LLP

[57] ABSTRACT

A wheel bearing unit for an automotive vehicle, and particularly a vehicle provided with ABS/traction control, includes a wheel bearing that is preferably a two row wheel bearing with the inner ring. A sensor is fixed in rotation with reference to the bearing unit and is supported to the bearing unit. A pulse generating ring is mounted around the sensor and is connected with the rotatable part of the wheel bearing, and particularly with the rotatable inner bearing ring to rotate with the rotatable ring and with respect to the sensor. An additional support bearing is provided for guiding the pulse generating ring and for supporting the pulse generating ring to the sensor to provide a constant air gap between them and to reliably mount the sensor. The additional support bearing is developed as an angular bearing. That angular bearing is prestressed by a spring. The force to the line of action of the additional support bearing extends substantially parallel to the force line of action to the adjacent wheel bearing or two row wheel bearing. Preferably, the support bearing is developed as an angular ball bearing with a cup shaped bottom, which serves for application of the spring thereto.

The additional spring loaded supported bearing is an angle bearing which supports and guides the sensor. The sensor can be snapped in the housing by a plug in type connection that opposes the initial spring stressing and the spring urges the sensor out when it is released.

13 Claims, 1 Drawing Sheet

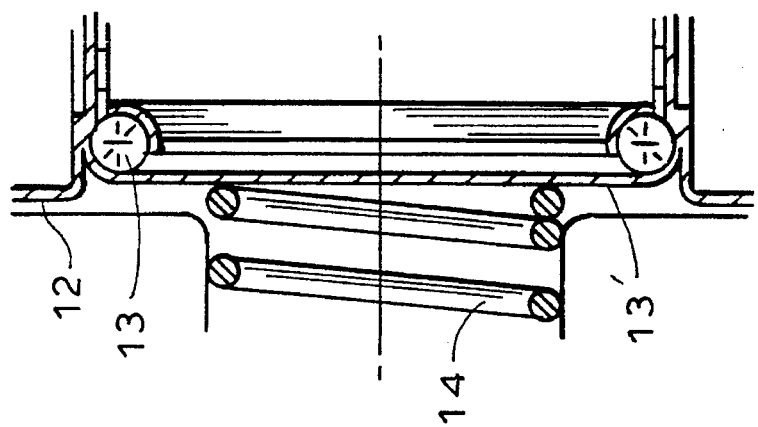
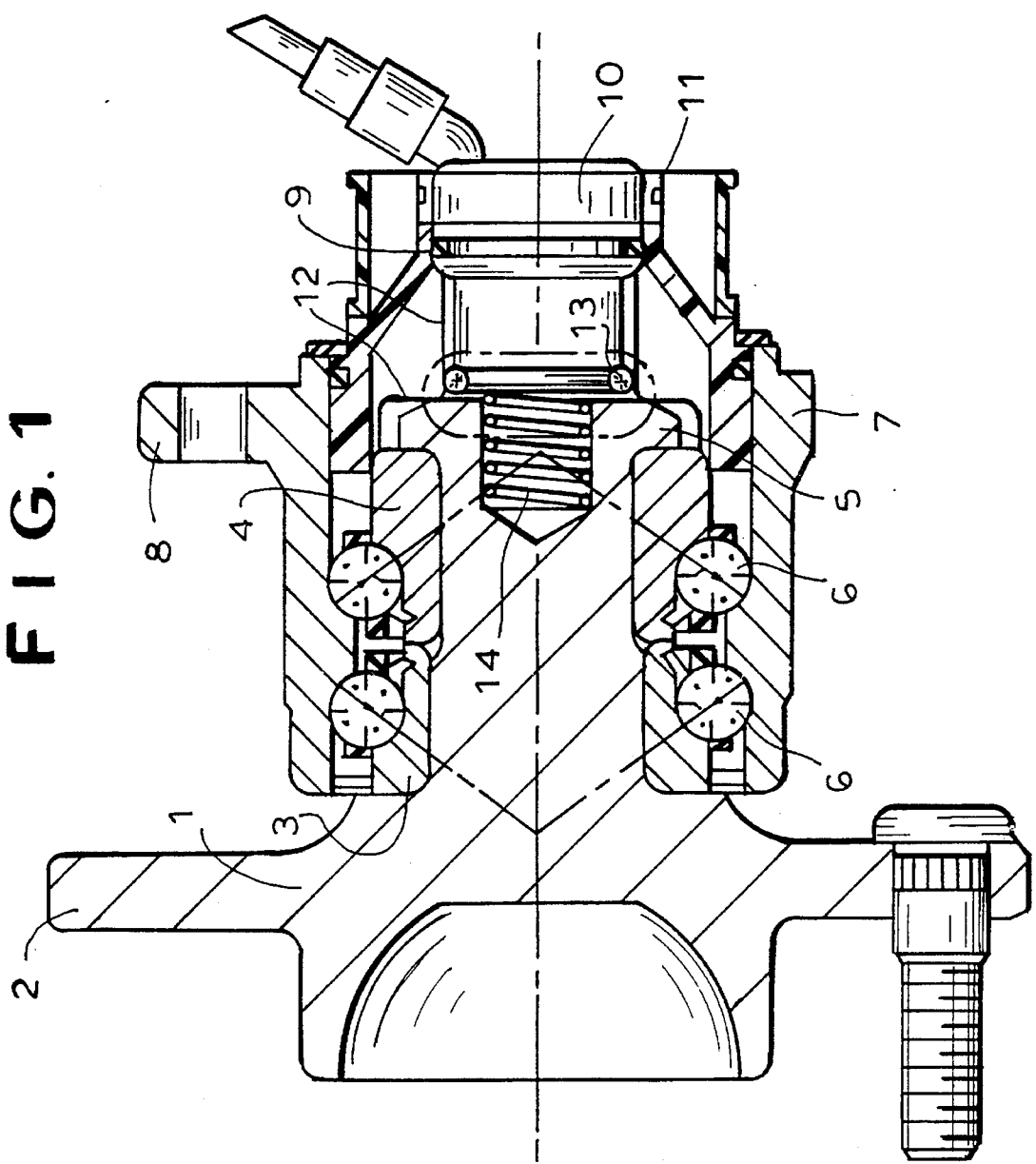

WHEEL BEARING UNIT WITH SPEED OF ROTATION SENSOR

BACKGROUND OF THE INVENTION

The present invention relates to a wheel bearing unit including a rotation speed sensor, preferably including a two row wheel bearing. The invention is useful for automotive vehicles, and particularly vehicles with an ABS/traction control system. There is a pulse generating ring which rotates with the bearing ring and a centrally arranged, rotationally fixed sensor on which the pulse generating ring is mounted.

Such a wheel bearing unit is described in German Patent Application P 42 13 379 of an assignee hereof. In that case, the pulse generating ring is developed as a cup shaped structural part which is rotatably mounted on the housing of the sensor, and it is coupled to the rotating bearing ring by a driver.

This mounting must assure an exact size of the air gap between the pulse generating ring and the sensor in order to exclude erroneous pulses. The sensor comprises, for instance, evaluation electronics and/or signal conversion. The sensor should be so fixed in position with respect to the pulse generating ring that even upon tilting of the ball races when the vehicle travels around curves or as a result of impact upon a wheel due to its striking against a curb, the air gap should change as little as possible and there may be no contact between the pulse ring and the sensor. Oscillations which occur on the wheel must not lead to errors in the measurement or to the development of noise. Further, it should be possible for the sensor to be easily mounted on the wheel bearing. In this connection, defective mounting, whether done by hand on an assembly line or by a mounting robot, must be reliably recognized so that it can be eliminated immediately. Finally, replacement of the sensor should be facilitated.

SUMMARY OF THE INVENTION

An object of the invention is to develop such a wheel bearing unit to avoid the disadvantages mentioned above, and so that play free, noise free support of the sensor is effected using simple means, wherein the air gap between the sensor and the pulse generating ring is maintained precisely. The support should furthermore assure reliable, verifiable mounting of the sensor and facilitate its replacement.

This object is achieved by the invention. A wheel bearing unit for an automotive vehicle, and particularly a vehicle provided with ABS/traction control, includes a wheel bearing that is preferably a two row wheel bearing with an inner ring. A sensor is fixed in rotation with reference to the bearing unit and is supported to the bearing unit. A pulse generating ring is mounted around the sensor and is connected with the rotatable part of the wheel bearing, and particularly with the rotatable inner bearing ring to rotate with the rotatable ring and with respect to the sensor.

An additional support bearing is provided for guiding the pulse generating ring and for supporting the pulse generating ring to the sensor to provide a constant air gap between them and to reliably mount the sensor. The additional support bearing is developed as an angular bearing. That angular bearing is prestressed by a spring. The force to the line of action of the additional support bearing extends substantially parallel to the force line of action to the adjacent wheel bearing or two row wheel bearing. Preferably, the support bearing is developed as an angular ball bearing with a cup shaped bottom, which serves for application of the spring thereto.

The additional spring loaded support bearing is developed as an angle bearing and bears and guides the sensor. The sensor can be snapped in the housing in the manner of a plug-in connection. With the initial spring stressing, a clearly perceptible and audible snap-in noise is thus obtained upon the mounting. However, even if a snap-in process is not used, it can be immediately observed when the sensor is not properly mounted, since the spring then forces the sensor out of the housing, which is evident.

Replacement of the sensor is facilitated, since after the loosening of the securing ring, the sensor is also pressed by the spring a distance out of the housing making the sensor then easier to grip. Removal tools like extractors are unnecessary. Furthermore, the spring seats the sensor under a slight initial stress in the housing and so that the sensor cannot rattle or experience fretting corrosion as a result of its oscillations.

Other objects features and advantages of the present invention are explained below with reference to the accompanying drawings.

BRIEF DESCRIPTION OF THE DRAWINGS

FIG. 1 is a side cross sectional view of a wheel bearing of the invention; and

FIG. 2 is an enlarged detail of FIG. 1 at X.

DETAILED DESCRIPTION OF THE INVENTION

FIG. 1 shows a section through a wheel bearing unit according to the invention which is shown as a two row ball bearing. Two side by side ball bearing inner rings 3, 4 are arranged on a central hub 1. The hub has an attachment flange 2. The rings 3, 4 are axially prestressed and are fixed in position around and along the hub and in their position axially inward along the hub by a plastically shaped bead 5. The inner rings, together with the bearing balls 6 and a single piece outer ring 7 around both rows of balls 6, form a wheel bearing in O-arrangement. The outer ring 7 also has an attachment flange 8, which extends radially outward and is positioned axially inward of the bearing balls 6. The outer ring 7 is held stationary against rotation.

Within the axially inward part of the bore of the stationary outer ring 7, there is an inserted plastic housing 9 which receives the sensor 10. The sensor is fixed in the non-rotating housing 9 by a snap ring 11.

Axially at and radially outward of the sensor 10 there is a surrounding pulse generating ring 12, which is connected with the rotating ball bearing inner ring 4 and also cooperates with the sensor.

As can be noted from the enlarged detail in FIG. 2, the pulse generating ring 12 is mounted on the sensor 10 via an additional support bearing 13, which is developed as an angle bearing. Even upon tilting of the wheel bearing, a precise air gap is produced between the pulse ring 12 and the sensor 10, and no contact takes place between them. The support bearing 13 is prestressed by a spring 14 which is disposed in a bore in the hub 1 and which rests below and against the cup shaped bottom 13' of the support bearing 13. In this connection, the line of action of the force of the support bearing extends substantially parallel to the line of action of the force of the adjacent wheel bearing row. To prevent the sensor from being forced out of the housing 9 by the spring force, it is secured in the housing by appropriate operable securing means, like a snap ring 11, a bayonet lock, or the like.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A wheel bearing unit for an automotive vehicle, comprising:

a rotatable wheel hub;

a bearing disposed on the hub, the bearing including a rotatable part which rotates with the hub and including a non-rotating part with respect to which the hub rotates;

a pulse generating ring mounted to the rotatable part of the bearing and rotatable therewith and rotatable with the hub;

a sensor attached to the non-rotating part of the bearing to be fixed in rotation with reference to rotation of the pulse generating ring, and the pulse generating ring being mounted at and on the sensor and being rotatable with reference to the sensor;

an additional support bearing at the sensor for supporting and guiding the pulse generating ring for rotation around the sensor and for maintaining an air gap between the sensor and the pulse generating ring; and a spring in the bearing and pressing on the additional support bearing and on the sensor for urging the sensor to move out of position with reference to the pulse generating ring while means hold the sensor in position against the pressing by the spring.

2. The wheel bearing unit of claim 1, wherein the bearing comprises a two row wheel bearing.

3. The wheel bearing unit of claim 2, wherein the bearing rotatable part is a bearing inner ring on and rotatable with the hub, and the pulse generating ring is connected with the bearing inner ring; the bearing non-rotatable part including a bearing outer ring; and the sensor being connected to the outer ring to be held stationary in rotation with reference to the inner ring.

4. The wheel bearing unit of claim 3, wherein the pulse generating ring extends around the sensor and the sensor is inside the pulse generating ring.

5. The wheel bearing unit of claim 4, further comprising securement means on the bearing outer ring for supporting the sensor against the spring force which acts on the additional support bearing and the sensor.

6. The wheel bearing unit of claim 3, wherein the additional support bearing, the spring and the sensor are respectively so located and they are axially to the side of the bearing such that the force to the line of action of the additional support bearing extends substantially parallel to the force line of action of the wheel bearing.

7. The wheel bearing of claim 2, wherein the additional support bearing is an angular bearing which is prestressed by the spring.

8. The wheel bearing unit of claim 7, wherein the additional support bearing is an angular ball bearing.

9. The wheel bearing unit of claim 8, wherein the additional support bearing includes a bottom which serves for the application of the spring thereto.

10. The wheel bearing unit of claim 9, wherein the bottom is cup shaped opening in the direction away from the spring.

11. The wheel bearing unit of claim 1, further comprising means in the stationary part of the bearing and on the sensor for opposing the spring forces on the sensor.

12. The wheel bearing unit of claim 11, wherein the means for opposing the spring force is selected from the group consisting of a snap ring and a bayonet lock cooperatingly provided on the bearing and the sensor.

13. The wheel bearing unit of claim 1, wherein the additional support bearing and the spring and sensor are respectively so located and they are axially to the side of the bearing such that the force to the line of action of the additional support bearing extends substantially parallel to the force line of action of the wheel bearing.

* * * * *